United States Patent
Shintani

(10) Patent No.: US 8,213,451 B2
(45) Date of Patent: Jul. 3, 2012

(54) WIRELESS COMMUNICATION TERMINAL, TRANSMISSION FUNCTION ADJUSTING METHOD AND TRANSMISSION FUNCTION CONTROL PROGRAM FOR USE IN WIRELESS COMMUNICATION TERMINAL

(75) Inventor: Tatsuyuki Shintani, Tokyo (JP)

(73) Assignee: NEC Corporation, Tokyo (JP)

( * ) Notice: Subject to any disclaimer, the term of this patent is extended or adjusted under 35 U.S.C. 154(b) by 635 days.

(21) Appl. No.: 12/161,881

(22) PCT Filed: Feb. 23, 2007

(86) PCT No.: PCT/JP2007/000125
§ 371 (c)(1),
(2), (4) Date: Jul. 23, 2008

(87) PCT Pub. No.: WO2007/099701
PCT Pub. Date: Sep. 7, 2007

(65) Prior Publication Data
US 2009/0036109 A1 Feb. 5, 2009

(30) Foreign Application Priority Data
Mar. 1, 2006 (JP) ................................. 2006-055589

(51) Int. Cl.
*H04J 3/16* (2006.01)
*H04B 7/216* (2006.01)
(52) U.S. Cl. ....................... 370/437; 370/329
(58) Field of Classification Search .................. 370/229, 370/235, 236, 328, 329, 331, 310, 335, 431, 370/437, 441; 455/422.1, 432.1, 436, 437, 455/438, 439, 450
See application file for complete search history.

(56) References Cited

U.S. PATENT DOCUMENTS

| | | | | |
|---|---|---|---|---|
| 7,668,092 B2 * | 2/2010 | Chiu et al. | | 370/231 |
| 2005/0111658 A1 * | 5/2005 | Ida et al. | | 380/28 |
| 2005/0227721 A1 | 10/2005 | Nakao | | |

FOREIGN PATENT DOCUMENTS

| | | |
|---|---|---|
| CN | 1296678 A | 5/2001 |
| CN | 1722904 A | 1/2006 |

(Continued)

OTHER PUBLICATIONS

"3rd Generation Partnership Project; Technical Specification Group Radio Access Network; Radio Resource Control (RRC); Protocol Specification", Release 6, 3GPP TS 25.331 V6.8.0, Dec. 2005, p. 327 (see pargarph 8.6.6.30).
International Search Report for PCT/JP2007/000125 mailed May 15, 2007.
Chinese Office Action for CN200780004375.3 issued Jul. 22, 2011.

(Continued)

*Primary Examiner* — Chi Pham
*Assistant Examiner* — Feben M Haile

(57) ABSTRACT

To provide a wireless communication terminal enabling to reduce the load on a mobile communication network and saving upstream wireless resources.
In step A1, an establishment request message for an individual channel is transmitted from a cell phone 10 to a mobile communication network NW. In step A2, determination is made as to whether an rrc Connection Setup Complete (individual channel establishment completion message) has been retransmitted at the establishment of the individual channel at the time of the previous communication. When the retransmission has been done (YES), it proceeds to step A3. In step A3, a predetermined delay time T1 is added to transmission timing with the individual channel, and transmission begins along the individual channel (DPDCH) at timing of parameters [PC Preamble+SRB delay]+delay time T1. As a result, after that, an individual channel establishment completion message will not be retransmitted.

6 Claims, 10 Drawing Sheets

FOREIGN PATENT DOCUMENTS

| | | |
|---|---|---|
| JP | 10-13338 A | 1/1998 |
| JP | 2000115029 A | 4/2000 |
| JP | 2000261371 A | 9/2000 |
| JP | 200308149 A | 11/2000 |
| JP | 2004007030 A | 1/2004 |
| JP | 2005277967 A | 10/2005 |

OTHER PUBLICATIONS

Japanese Office Action for JP2008-502660 issued Oct. 25, 2011.
Ericsson, "Specification of RPC procedure: RPC connection establishment", TSG-RAN Working Group 2 (Radio layer 2 and Radio layer 3), TSGR2#6(99)813, Aug. 1999.

* cited by examiner

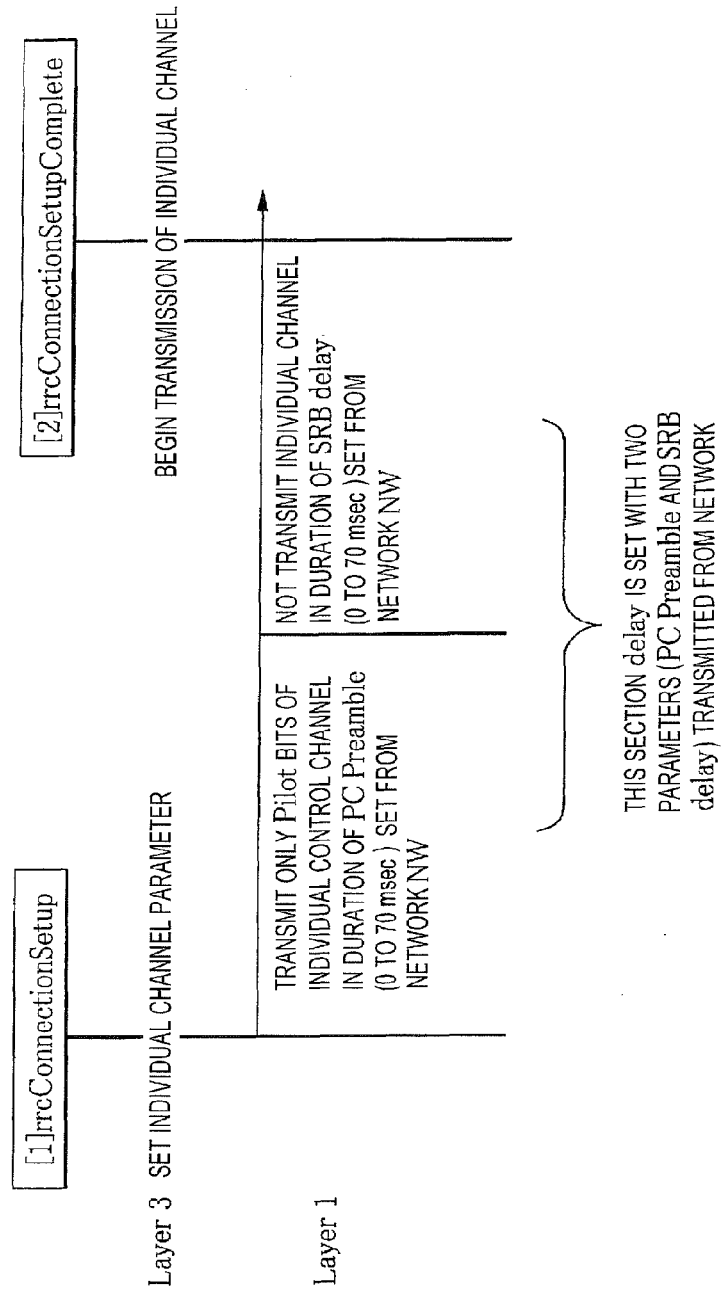

WIRELESS COMMUNICATION TERMINAL, TRANSMISSION FUNCTION ADJUSTING METHOD AND TRANSMISSION FUNCTION CONTROL PROGRAM FOR USE IN WIRELESS COMMUNICATION TERMINAL

TECHNICAL FIELD

This invention relates to a wireless communication terminal, a transmission function adjusting method and transmission function control program for use in the wireless communication terminal, and, more particularly, to a wireless communication terminal suitably applicable to cell phones based on the 3GPP ($3^{rd}$ Generation Partnership Project) standard for corresponding to the specification of third generation mobile communication systems, a transmission function adjusting method and transmission function control program for use in the wireless communication terminal.

BACKGROUND ART

In recent years, a communication system using a system such as W-CDMA (Wideband Code Division Multiple Access) has been developed as a third generation mobile communication unit. This provides services, such as audio communication, packet communication and the like, from a mobile communication network, to wireless communication terminals, such as cell phones and the like.

Conventionally, this kind of communication system is formed of a mobile communication network NW, having a cell phone 1 and a wireless base station 2 which is wirelessly connected to the cell phone 1, as shown in FIG. 8.

The mobile communication network NW is formed of the above-described wireless base station 2, a non-illustrative mobile communication control station, visited network mobile communication switching station, gateway mobile communication switching station, and general telephone line, etc.

In this communication system, a user who uses the cell phone 1 transmits an individual channel establishment request message from the cell phone 1 to the mobile communication network NW, when he/she wants to get the service, such as audio communication, packet communication, or the like (Phase A).

The mobile communication network NW informs the cell phone 1 of a plurality of set parameters (individual channel establishment parameters) for establishing an individual channel, correspondingly to an individual channel establishment request message A transmitted from the cell phone 1 (Phase B).

In the cell phone 1, connection is established in the individual channel so as to begin transmission of a predetermined message, using the informed individual channel establishment parameter (Phase C). As a result, the user of the cell phone 1 is provided with the services, such as the audio communication, packet communication, and the like.

FIG. 9 is a diagram showing an audio transmission sequence of a layer (hierarchy) level 3 based on 3GPP communication specification, TS25.331, for communication between the cell phone 1 and the mobile communication network NW shown in FIG. 8.

As shown in FIG. 9, once an individual channel establishment request message (rrc Connection Request) for requesting an audio communication service is issued from the cell phone 1, the first individual channel is established between the cell phone 1 and the mobile communication network NW, control data, such as individual identification (measurement Control) and authentication (security Mode Command, security Mode Complete) of the cell phone 1 and the like are transmitted between the cell phone 1 and the mobile communication network NW.

Now, for transmission of actual audio data between the cell phone 1 and the mobile communication network NW, the second individual channel is established. This second individual channel is maintained while providing the audio communication service, so as to establish the audio communication service.

In the establishment of the first individual channel, the cell phone 1 is informed of a plurality of set parameters for establishing the first individual channel from the mobile communication network NW, using an rrc (radio resource control, wireless resource control) Connection Setup message [1].

In response to this, when replying an rrc Connection Setup complete message [2] from the cell phone 1, transmission with the first individual channel begins, and the first individual channel is established.

In the establishment of the second individual channel, the cell phone 1 is informed of a plurality of set parameters for establishing the second individual channel using a radio Bearer Setup message [3] from the mobile communication network NW.

These set parameters correspond to a transmission reception individual channel for audio or packet data. In the cell phone 1, transmission with the second individual channel begins, and the second individual channel is established, using the informed plurality of set parameters.

In this case, the cell phone 1 is informed of transmission timing from the mobile communication network NW with the second individual channel, using the already-established first individual channel.

FIG. 10 is a sequence diagram for explaining operations of the cell phone 1 in the layer level 1 in the term from the reception of the Setup message [1] to transmission of the rrc Connection Setup complete message [2] in FIG. 9.

As shown in FIG. 10, the cell phone 1 sets the set parameters for establishing the first individual channel and included in the received rrc Connection Setup message [1] from the mobile communication network NW, into the layer (Layer) 1.

In the 3GPP communication specification, the timing for data transmission from the cell phone 1 with the first individual channel is based on the parameters, [PC (Packet Combining) preamble (0 to 70 msec) and SRB (Source Routing Bridging) delay (0 to 70 msec)], in the rrc Connection Setup message, thus is obtained with these two parameters [PC Preamble+SRB delay].

In the term of the parameter [PC Preamble], only the pilot bits of the individual control channel are transmitted. In the term of the parameter [SRB delay], no data transmission is performed with the first individual channel.

The time that is obtained based on the parameters [PC Preamble+SRB delay] is the time that is required when receiving data transmitted from the cell phone 1 with the first individual channel on the side of the mobile communication network NW.

Other than the above-described wireless communication terminal, conventionally, this kind of techniques is disclosed in the following documents.

In a spread spectrum communication system disclosed in Patent document 1, the sub station performs frame synchronization based on a downstream reference signal transmitted from the main station, and transmits an upstream control signal based on this frame synchronization. The main station obtains a propagation delay time in a wireless section from the relationship between a downstream control signal and the upstream control signal. The sub station transmits an upstream data signal in synchronization with a frame synchronization signal, and the main station receives the upstream data signal at timing in accordance with the propagation delay time.

The sub station performs frame synchronization based on the upstream reference signal transmitted from the main station, and transmits an upstream control signal based on this frame synchronization. The main station obtains the propagation delay time in a wireless section from the relationship between the downstream control signal and the upstream control signal, and gives information about the propagation delay time to the sub station through a downstream channel. The sub station transmits an upstream data signal at timing in accordance with the propagation delay time. Then, the main station receives the upstream data signal.

As a result, even in the case where a transmission path has a large delay, high speed synchronization of a long-cycle spread code is enabled without a large increase in the hardware scale.

According to a communication control method disclosed in Patent document 2, in the packet reception, a mobile station controls transmission power of an upstream individual channel based only on transmission power control information included in a downstream individual channel from a packet transmission base station.

Patent document 1: Japanese Unexamined patent publication NO. 2000-115029 (claims 1 and 5)

Patent document 2: Japanese Unexamined patent publication NO. 2004-007030 (claim 1).

DISCLOSURE OF THE INVENTION

Problems to be Solved by the Invention

However, the above-described prior art wireless communication terminal has the following problems.

That is, in the case where the time obtained with the parameters [PC Preamble+SRB delay] in FIG. 10 are set shorter than an optimum value due to adjustment defects on side of the mobile communication network NW, in a state where the first individual channel is not ready for reception in the mobile communication network NW, the cell phone 1 may perform data transmission with the first individual channel.

Thus, problems are that unnecessary data transmission is performed by the cell phone 1, the load on the side of the mobile communication network NW increases, and wireless resources are wasted.

The spread spectrum communication system disclosed in Patent document 1 has a different configuration from this invention, because the system is to obtain the propagation delay time in the wireless section using the main station.

The communication control method disclosed in Patent document 2 differs from the configuration of this invention. According to the method, transmission power of the upstream individual channel is controlled based only on transmission power control information included in the downstream individual channel from the packet transmission base station.

This invention has been made in consideration of the above circumstances. An object thereof is to provide a wireless communication terminal for reducing the load on a mobile communication network and saving upstream wireless communication resources, a transmission function adjusting method and transmission function control program for use in the wireless communication terminal.

Means for Solving the Problem

In order to solve the above problems, according to the invention of claim 1, there is provided a wireless communication terminal which transmits an individual channel establishment request message to a mobile communication network, establishes an individual channel using an individual channel establishment parameter informed in response to the individual channel establishment request message from the mobile communication network, and transmits an individual channel establishment completion message to the mobile communication network based on transmission start timing included in the individual channel establishment parameter, the terminal comprising a transmission start timing adjusting unit which retransmits the individual channel establishment completion message and stores information representing that this retransmission has been done, when a retransmission request message for the individual channel establishment completion message has been transmitted from the mobile communication network, and adds a predetermined delay time to the transmission start timing, when to transmit a next individual channel establishment completion message.

In the invention of claim 2 according to the wireless communication terminal of claim 1, the transmission start timing adjusting unit includes a storage unit which stores the information representing that the individual channel establishment completion message has been retransmitted, and a delay time setting unit which adds the delay time to the transmission start timing, when to transmit the next individual channel establishment completion message, if the information representing that the individual channel establishment completion message has been retransmitted is stored in the storage unit.

In the invention of claim 3 according to the wireless communication terminal of claim 2, the delay time setting unit is configured to increate the delay time, correspondingly to number of times the individual channel establishment completion message stored in the storage unit has been retransmitted.

According to the invention of claim 4, there is provided a wireless communication terminal which transmits an individual channel establishment request message to a mobile communication network, establishes an individual channel using an individual channel establishment parameter informed in response to the individual channel establishment request message from the mobile communication network, and transmits an individual channel establishment completion message to the mobile communication network based on a transmission power level included in the individual channel establishment parameter, and the terminal comprising a transmission power level adjusting unit which retransmits the individual channel establishment completion message and stores information representing that this retransmission has been done, when a retransmission request message for the individual channel establishment completion message has been transmitted from the mobile communication network, and adds a predetermined additional power level to the transmission power level, when to transmit a next individual channel establishment completion message.

According to the invention of claim 5, there is provided a transmission function adjusting method for use in a wireless communication terminal which transmits an individual channel establishment request message to a mobile communication network, establishes an individual channel using an individual channel establishment parameter informed in response to the individual channel establishment request message from the mobile communication network, and transmits an individual channel establishment completion message to the mobile communication network based on transmission start timing included in the individual channel establishment parameter, the method comprising: retransmitting the individual channel establishment completion message and storing information representing that this retransmission has been done, when a retransmission request message for the individual channel establishment completion message has been transmitted from the mobile communication network, and adding a predetermined delay time to the transmission start timing, when to transmit a next individual channel establishment completion message.

In the invention of claim 6, the transmission function adjusting method according to claim 5 comprises increasing the delay time, correspondingly to number of times the stored individual channel establishment completion message has been retransmitted.

In one embodiment of the invention, there is provided a transmission function adjusting method for use in a wireless communication terminal which transmits an individual channel establishment request message to a mobile communication network, establishes an individual channel using an individual channel establishment parameter informed from the mobile communication network, and transmits an individual channel establishment completion message to the mobile communication network based on a transmission power level included in the individual channel establishment parameter, the method comprising: retransmitting the individual channel establishment completion message and storing information representing that this retransmission has been done, when a retransmission request message for the individual channel establishment completion message has been transmitted from the mobile communication network; and adding a predetermined additional power level to the transmission power level, when to transmit a next individual channel establishment completion message.

In one embodiment of the invention, there is provided a computer readable transmission function control program for controlling a computer to function as the transmission start timing adjusting unit according to claim 1 or 2.

In one embodiment of the invention, there is provided a computer readable transmission function control program for controlling a computer to function as the transmission power level adjusting unit according to claim 4.

Effects of the Invention

According to the configuration of this invention, when the retransmission request message for the individual channel establishment completion message is transmitted from the mobile communication network, the transmission start timing adjusting unit retransmits the individual channel establishment completion message and stores information representing that the retransmission has been performed. When a next individual channel establishment completion message is transmitted, a predetermined delay time is added to the transmission start timing. This results in suppressing the retransmission of the individual channel establishment completion message, after that. Thus, unnecessary retransmission of the upstream message can be reduced, and data processing in the mobile communication network can be reduced, thus reducing the load on the mobile communication network and saving the upstream wireless resources. The delay time setting unit increases the delay time correspondingly to the number of times the individual channel establishment completion message that is stored in the storage unit is retransmitted. Therefore, after the transmission start timing of the individual channel is adjusted, the corresponding processing can smoothly be performed, even if the retransmission request is further issued. When the retransmission request message for the individual channel establishment completion message is transmitted from the mobile communication network, the transmission power level adjusting unit retransmits the individual channel establishment completion message and stores information representing that the retransmission has been performed. When the next individual channel establishment completion message is transmitted, a predetermined additional power level is added to the transmission power level. As a result, even with the proper parameter informed by the mobile communication network, if the retransmission of the individual channel establishment completion message occurs due to a degraded wireless communication environment, the corresponding processing can smoothly be performed, thus enabling to suppress the retransmission.

BRIEF DESCRIPTION OF THE DRAWINGS

The above and other objects, advantages and features will be more apparent from the following description of preferred embodiments and from the accompanying drawings.

FIG. 10 is a sequence diagram for explaining operations of a cell phone.

BEST MODE FOR CARRYING OUT THE INVENTION

Provided are a wireless communication terminal which determines that an inappropriate parameter has been received based on a retransmission request message and appropriately adjusts transmission timing through an individual data channel or its transmission power, upon notification of an inappropriate individual channel establishment parameter from a mobile communication network, and a transmission function adjusting method and transmission function control program for use in the wireless communication terminal.

Embodiment 1

Figure 1:
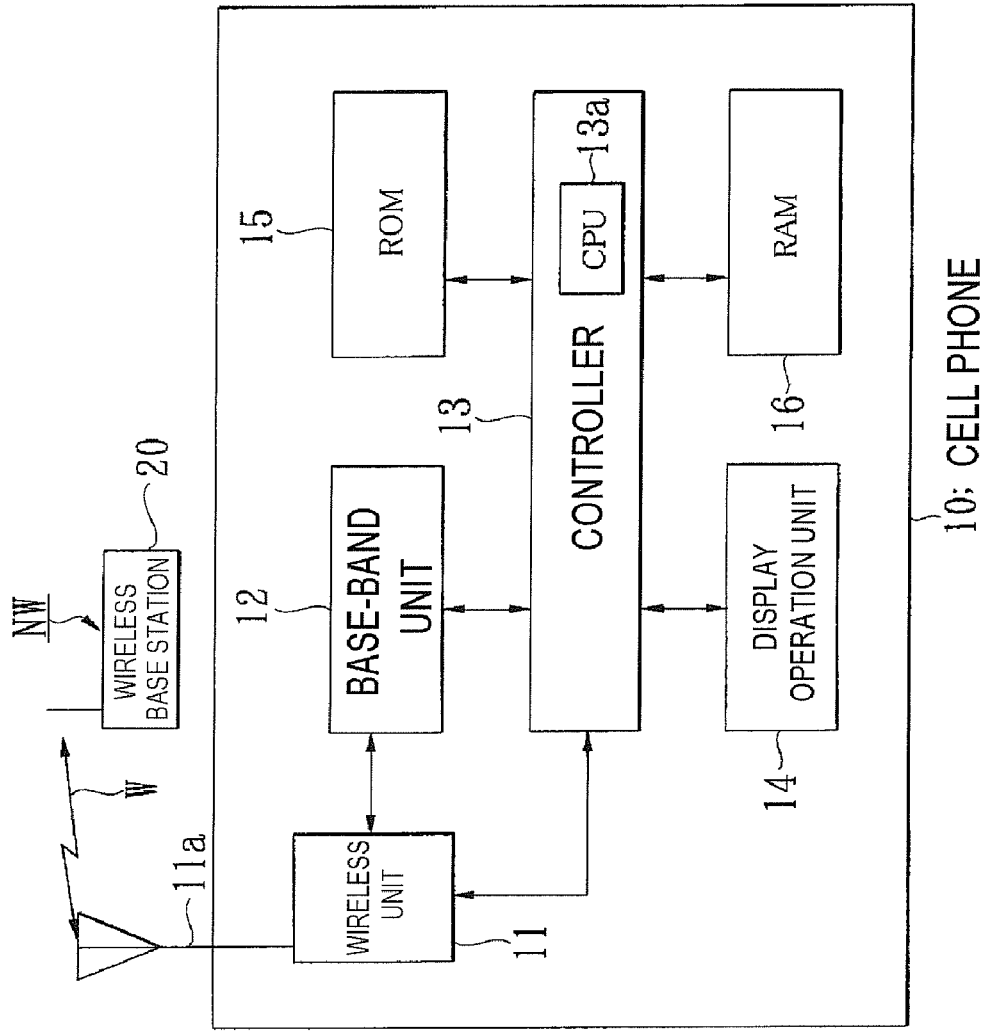
FIG. 1 is a block diagram showing an electrical configuration of main parts of a wireless communication terminal as a first embodiment of this invention.

FIG. 1 is a block diagram showing an electrical configuration of main parts of a wireless communication terminal as a first embodiment of this invention.

As shown in the illustration, the wireless communication terminal of this embodiment is a cell phone 10, and includes a wireless unit 11, an antenna 11a, a base-band unit 12, a controller 13, a display operation unit 14, a ROM (Read Only Memory) 15, and a RAM (Random Access Memory) 16.

The wireless unit 11 is wirelessly connected to a wireless base station 20 through the antenna 11a, transmits a signal input from the base-band unit 12 to the wireless base station 20 using an electric wave W based on the control of the controller 13, searches for and receives a signal transmitted from the wireless base station 20, and transmits it to the base-band unit 12.

The wireless base station 20 is connected to a general telephone line network, through a non-illustrative mobile communication control station, visited network mobile communication switching station and gateway mobile communication switching station.

A mobile communication network NW is composed of the wireless base station 20, the mobile communication control station, the visited network mobile communication switching station, the gateway mobile communication switching station and the general telephone line network.

The base-band unit 12 executes base-band processing for data specified by the controller 13 and then outputs it to the wireless unit 11, and executes base-band processing for a signal input by the wireless unit 11.

The display operation unit 14 is formed of, for example, a liquid crystal display unit, a key switch and the like. The unit 14 displays each data for the user, and transmits a signal corresponding to the operation contents input by the user to the controller 13, based on the control of the controller 13.

The controller 13 has a CPU (Central Processing unit) 13a which controls the cell phone 10 entirely. The ROM 15 stores a transmission function control program for operating the CPU 13a.

This controller 13 transmits an individual channel establishment request message to the mobile communication network NW, establishes an individual channel using an individual channel establishment parameter which is informed in response to the individual channel establishment request message from the mobile communication network NW, and transmits an individual channel establishment completion message to the mobile communication network NW based on transmission start timing included in the individual channel establishment parameter, based on the transmission function control program.

Particularly, in this embodiment, if parameters [PC Preamble+SRB delay] are set shorter than their adequate value due to adjustment defects on the side of the mobile communication network NW, when the transmitted individual channel establishment completion message is not received by the mobile communication network NW, and a retransmission request message for the individual channel establishment completion message is transmitted from the mobile communication network NW, the controller 13 retransmits the individual channel establishment completion message, and stores information representing this retransmission in the RAM 16. When to transmit a next individual channel establishment completion message, if information representing that the individual channel establishment completion message has been retransmitted is stored in the RAM 16, it adds a predetermined delay time to the transmission start timing. This delay time is stored in the ROM 15.

Figure 2:
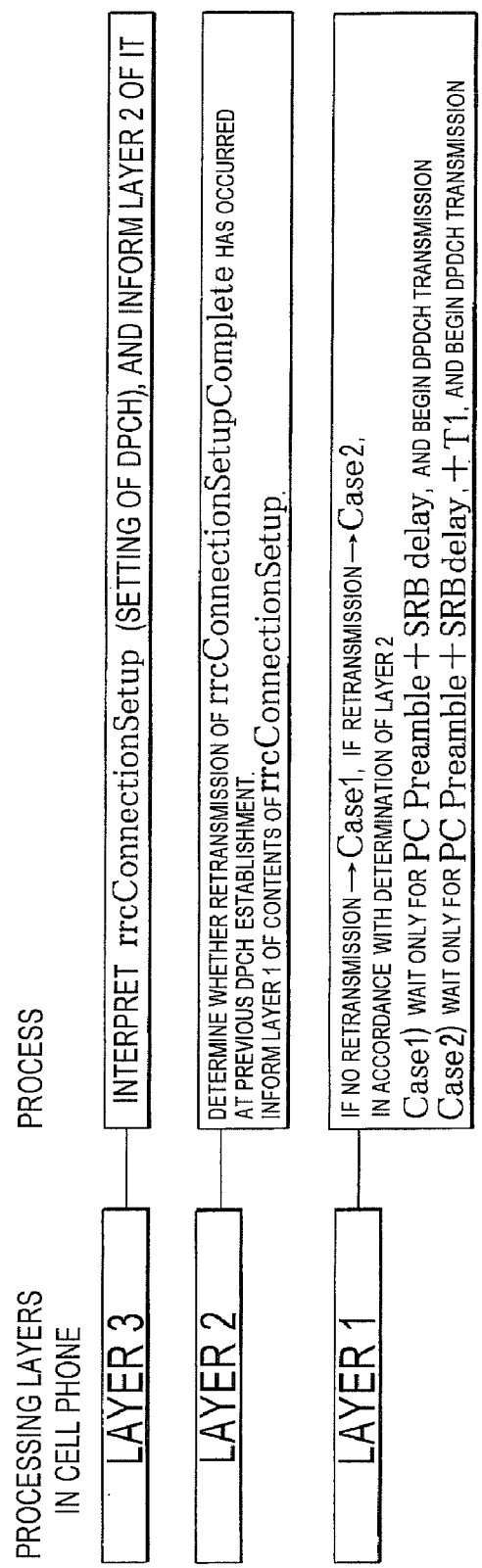
FIG. 2 is a diagram showing processing functions by layers (hierarchy) included in a controller of a cell phone.

FIG. 2 is a diagram showing processing functions by layers (hierarchy) included in the controller 13 of the cell phone 10.

As shown in FIG. 2, the layers are composed of layer 3, layer 2 and layer 1.

In layer 3, an rrc Connection Setup message (individual channel establishment parameter, DPCH, Dedicated Physical Channel) transmitted from the mobile communication network NW is interpreted (i.e., demodulated), and the message is given to layer 2.

In layer 2, when establishing an individual channel at the time of the previous communication, determination is made as to whether retransmission of an rrc Connection Setup complete message (an individual channel establishment completion message) has been performed, and a parameter necessary for individual channel setting is informed to layer 1.

In layer 1, when the retransmission has not been performed (Case 1), in accordance with the determination from layer 2, the transmission begins along an individual channel (DPDCH, Dedicated Physical Data Channel) at timing (wait time) of parameters [PC Preamble+SRB delay].

When the retransmission has been performed (Case 2), the transmission begins along the individual channel (DPDCH) at timing of parameters [PC Preamble+SRB delay]+delay time T1 (wait time), using the delay time T1 stored in the ROM 15.

Figure 3:
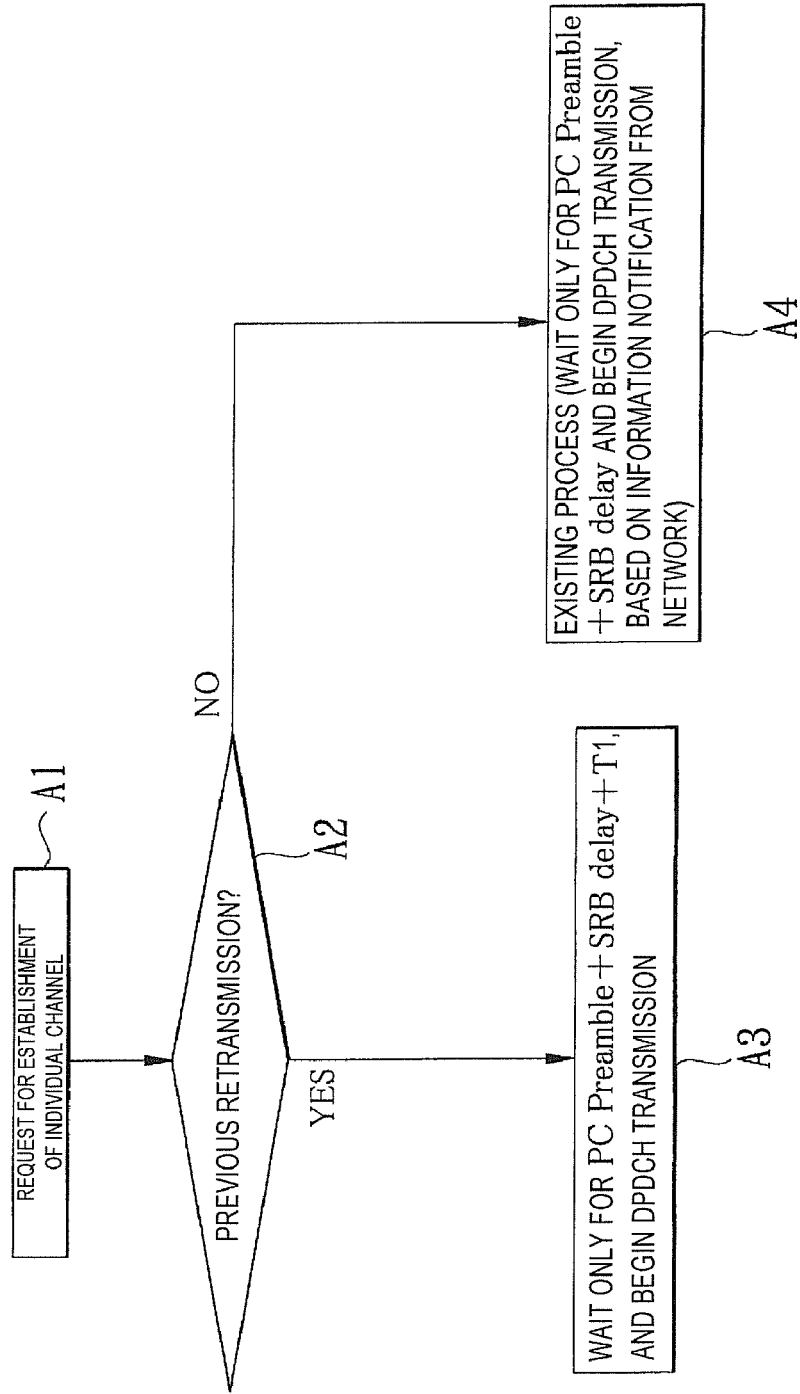
FIG. 3 is a flowchart for explaining operations of a cell phone having the processing functions shown in FIG. 2.

FIG. 3 is a flowchart for explaining operations of the cell phone 10 having the processing functions shown in FIG. 2.

With reference to this illustration, descriptions will now be made to operation contents of a transmission function adjusting method for use in the cell phone 10 of this embodiment.

In this cell phone 10, an individual channel establishment request message is transmitted to the mobile communication network NW, an individual channel is established using individual channel establishment parameters informed in response to the individual channel establishment request message from the mobile communication network NW, and an individual channel establishment completion message is transmitted to the mobile communication network NW based on the transmission start timing included in the individual channel establishment parameters.

Upon transmission of a retransmission request message for the individual channel establishment completion message from the mobile communication network NW, the individual channel establishment completion message is retransmitted, and information representing that the retransmission has been done is stored. Upon transmission of a next individual channel establishment completion message, a predetermined delay time is added to the transmission start timing.

That is, as shown in FIG. 3, in step A1, an establishment request message for an individual channel is transmitted from the cell phone 10 to the mobile communication network NW. Next, in step A2, at the previous communication, determination is made as to whether retransmission of an rrc Connection Setup Complete (individual channel establishment completion message) has been performed at the establishment of the individual channel. When the retransmission has been performed (YES), it proceeds to step A3.

In step A3, the predetermined delay time T1 stored in the ROM 15 is added thereto, and the transmission begins along the individual channel (DPDCH) at the timing of the parameters [PC Preamble+SRB delay]+delay time T1, at transmission timing along the individual channel. As a result, after this, the retransmission of the individual channel establishment completion message will not be performed.

In step A2, when the retransmission is not performed (NO), it proceeds to step A4. In step A4, transmission begins along the individual channel (DPDCH) at the timing of the parameters [PC Preamble+SRB delay] based on the notification from the mobile communication network NW.

Accordingly, in this first embodiment, the individual channel establishment request message is transmitted to the mobile communication network NW from the cell phone 10, and the determination is made as to whether the individual channel establishment completion message has been retransmitted at the establishment of the individual channel, at the time of the previous communication. When the retransmission has been performed, the predetermined delay time T1 is added to the transmission timing with the individual channel, and the transmission begins with the individual channel at the timing of the parameters [PC Preamble+SRB delay]+delay time T1.

This results in suppressing the retransmission of the individual channel establishment completion message, thereafter. As a result, unnecessary retransmission of the upstream message is reduced, and the data processing in the mobile communication network NW is reduced, thus enabling to save upstream wireless resources.

Embodiment 2

Figure 4:
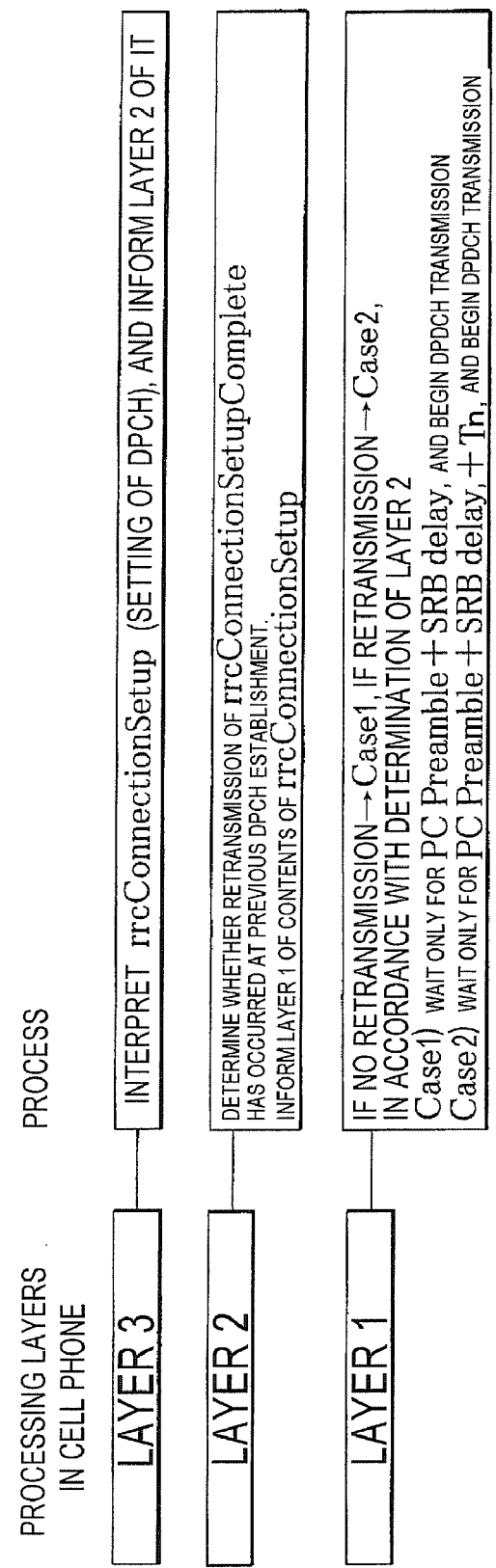
FIG. 4 is a diagram showing processing functions by layers included in a controller of a cell phone as a second embodiment of this invention.

FIG. 4 is a diagram showing processing functions by layers included in the controller 13 of the cell phone 10 as the second embodiment of this invention.

The controller 13 of this embodiment is configured to increase the delay time to be added to the transmission start timing correspondingly to an "n" number of times the retransmission has been performed, when information representing that the individual channel establishment completion message has been retransmitted is stored in the RAM 16.

That is, as shown in FIG. 4, in layer 1, when the retransmission has been performed (Case 2), in accordance with the determination from layer 2, the transmission along the individual channel (DPDCH) begins at the timing of the parameters [PC Preamble+SRB delay]+delay time Tn (note that Tn>T1, for example, Tn=T1×the number of times the retransmission has been performed), using the delay time T1 stored in the ROM 15.

According to the transmission function adjusting method for use in the cell phone 10 of this embodiment, the delay time to be added to the transmission start timing is increased correspondingly to the information representing the number of times the individual channel establishment completion message stored in the RAM 16 has been retransmitted.

Figure 5:
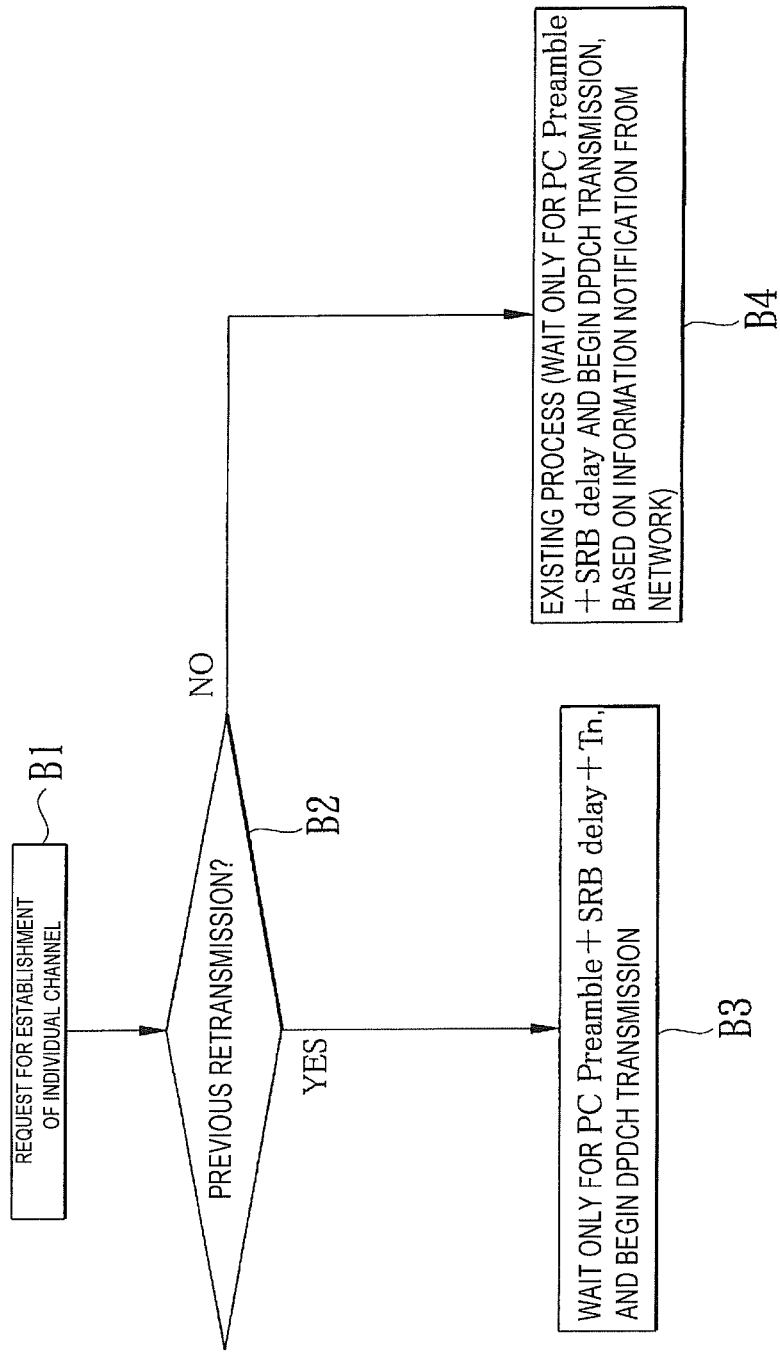
FIG. 5 is a flowchart for explaining operations of the cell phone having the processing functions shown in FIG. 4.

That is, as shown in FIG. 5, the same operations as those of step A1 and step A2 in FIG. 3 showing the above-described first embodiment are performed in step B1 and step B2. In step B3, the delay time to be added to the transmission start timing is increased correspondingly to the "n" number of times the individual channel establishment completion message has been retransmitted, and the transmission begins along the individual channel (DPDCH) at the timing of the parameters [PC Preamble+SRB delay]+delay time Tn.

As a result, after the transmission start timing of the individual channel is adjusted, the corresponding processing can smoothly be performed, even if the retransmission request is further issued. In step B4, the same operation as that of step A4 in FIG. 3 can be performed.

Embodiment 3

Figure 6:
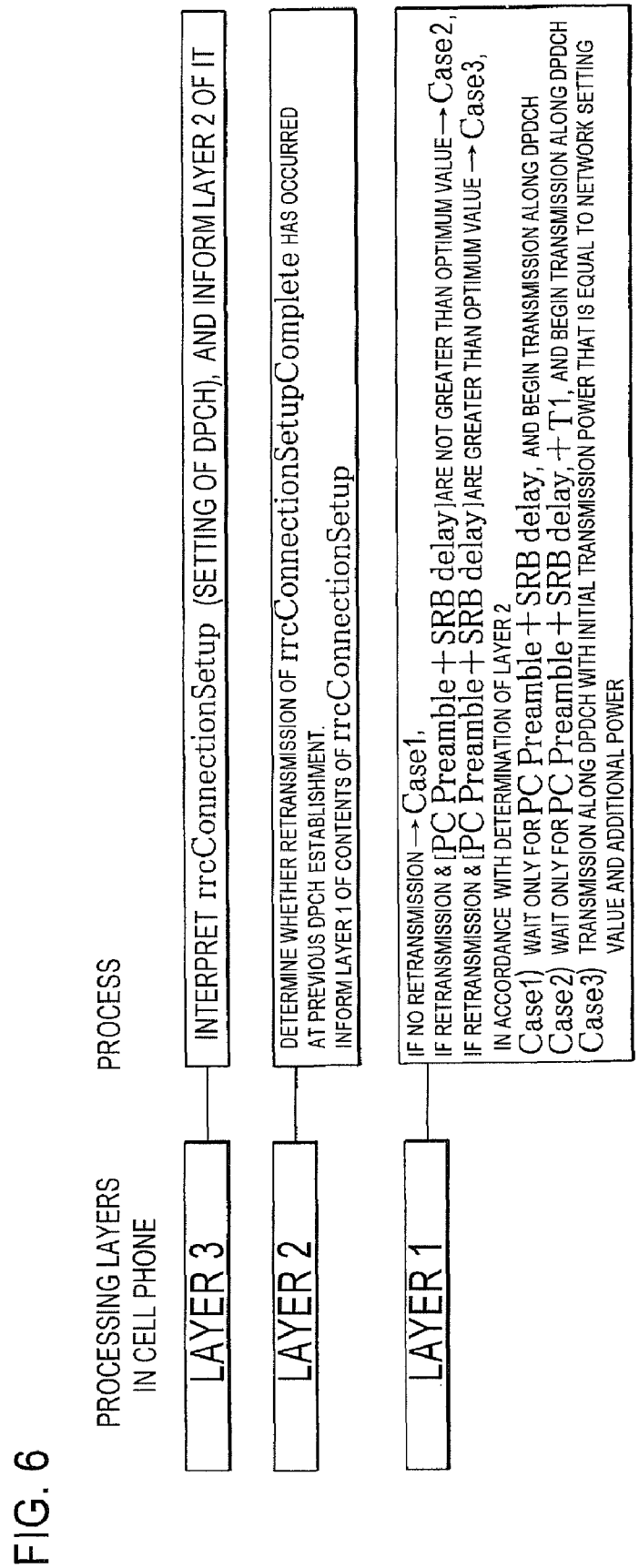
FIG. 6 is a diagram showing processing functions by layers included in a controller of a cell phone as a third embodiment of this invention.

FIG. 6 is a diagram showing processing functions by layers included in the controller 13 of the cell phone 10 as the third embodiment of this invention.

The controller 13 of this embodiment is configured to adjust the transmission power level to an optimum value by adding a predetermined additional power level to the transmission power level, when transmitting a next individual channel establishment completion message, in the case where information representing that the individual channel establishment completion message has been retransmitted is stored in the RAM 16.

This predetermined additional power level is stored in the ROM 15. That is, as shown in FIG. 6, in layer 1, if the individual channel establishment completion message is retransmitted in accordance with the determination from layer 2, and if the parameters [PC Preamble+SRB delay] are not greater than a preset optimum value (Case 2), like the first embodiment, the transmission begins with the individual channel (DPDCH) at the timing (wait time) of the parameters [PC Preamble+SRB delay]+delay time T1, using the delay time T1 stored in the ROM 15.

If the individual channel establishment completion message is retransmitted, and if the parameters [PC Preamble+SRB delay] are greater than the above-described optimum value (Case 3), the transmission is performed with the individual channel (DPDCH) with the initial transmission power which is equal to network setting value+additional power.

According to the transmission function adjusting method used for the cell phone 10 of this embodiment, the individual channel establishment request message is transmitted to the mobile communication network NW, the individual channel is established using the individual channel establishment parameter informed from the mobile communication network NW, and the individual channel establishment completion message is transmitted to the mobile communication network NW based on the transmission power level included in the individual channel establishment parameter.

When a retransmission request message for the individual channel establishment completion message is transmitted from the mobile communication network NW, the individual channel establishment completion message is retransmitted and information representing that the retransmission has been performed is stored. When a next individual channel establishment completion message is transmitted, a predetermined additional power level is added to the above-described transmission power level.

Figure 7:
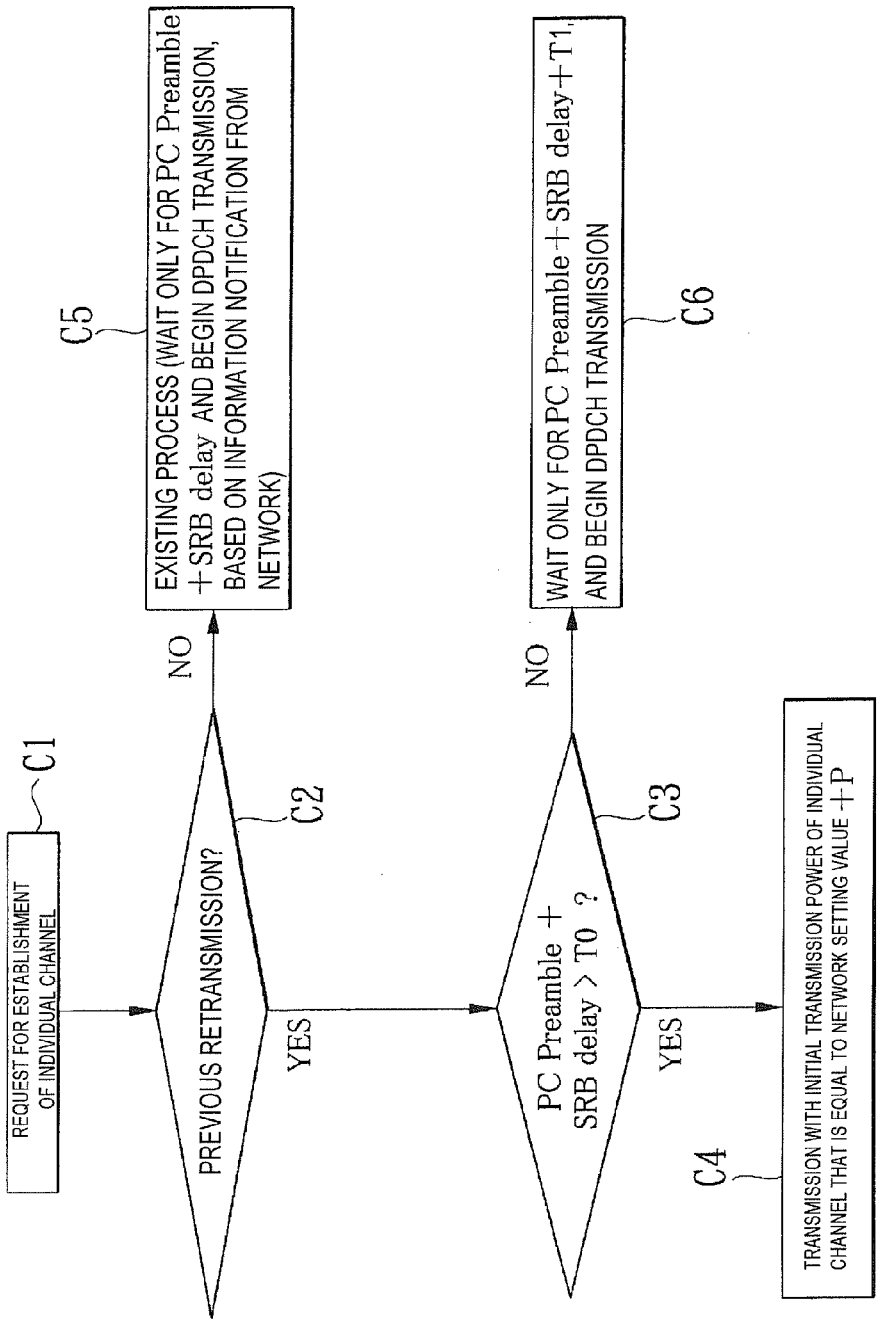
FIG. 7 is a flowchart for explaining operations of the cell phone having the processing functions shown in FIG. 6.
Figure 8:
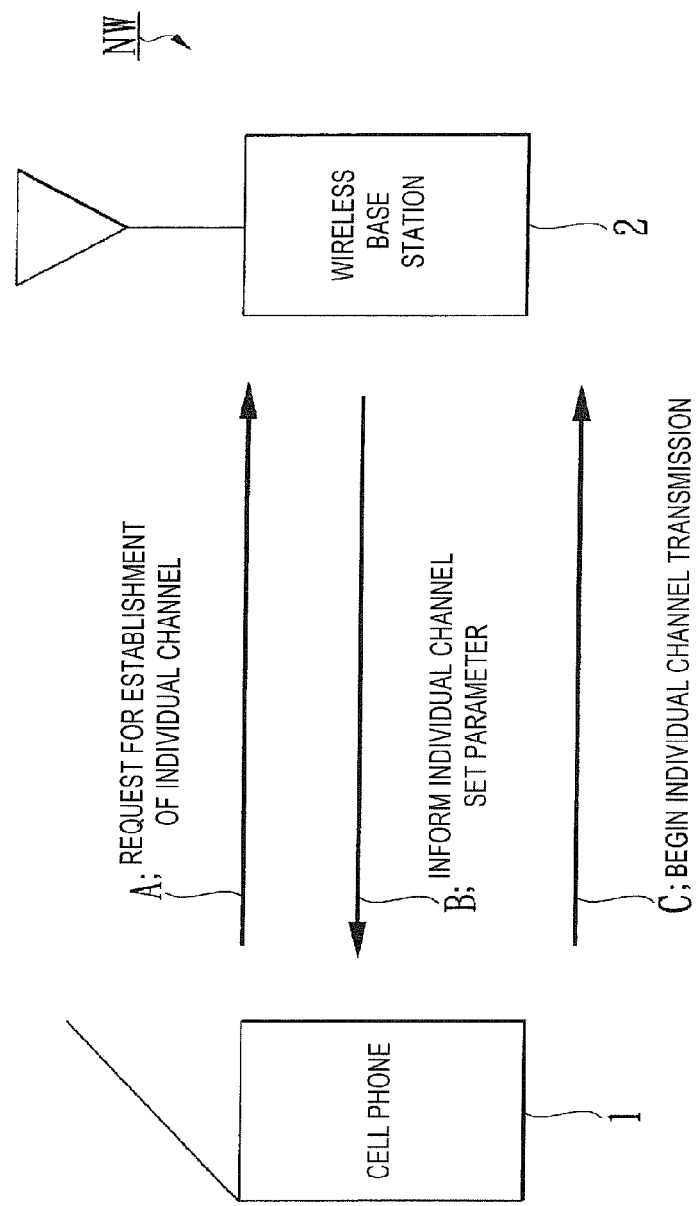
FIG. 8 is a configuration example of a prior art communication system.
Figure 9:
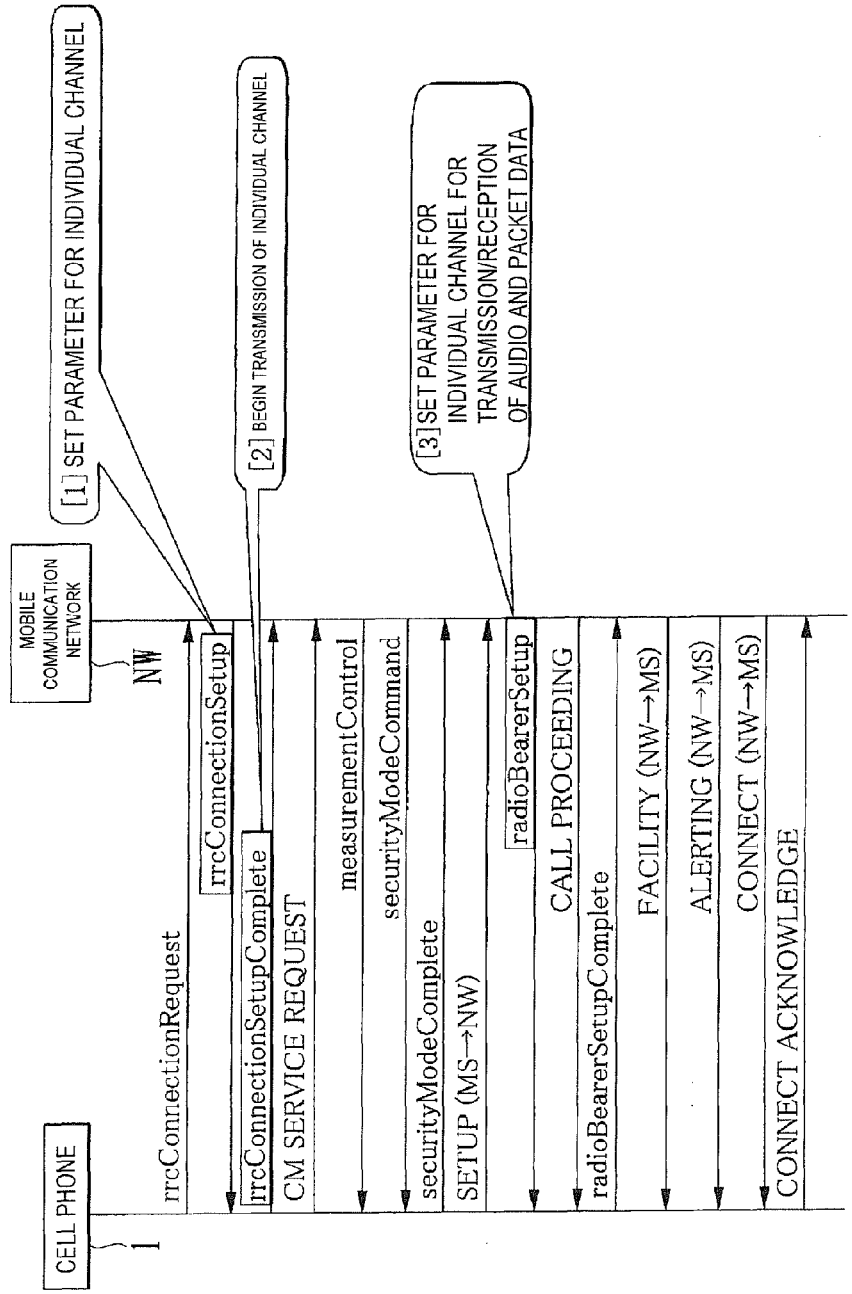
FIG. 9 is a sequence diagram showing communications between a cell phone in FIG. 8 and a mobile communication network NW.

That is, as shown in FIG. 7, the same operations as those of step A1, step A2 and step A4 in FIG. 3 are performed in Step C1, step C2 and step C5. If the individual channel establishment completion message is retransmitted in Step C3, and the parameters [PC Preamble+SRB delay] are not greater than the preset optimum value T0 (NO), it proceeds to step C6. Then, like the first embodiment, the transmission begins with the individual channel (DPDCH) at the timing of the parameters [PC Preamble+SRB delay]+delay time T1, using the delay time T1 stored in the ROM 15.

On the contrary, if the individual channel establishment completion message is retransmitted, and the parameters [PC Preamble+SRB delay] are greater than the optimum value T0 (YES), it proceeds to step C4, wherein the transmission is performed with the initial transmission power along the individual channel (DPDCH) which is equal to network setting value+additional power.

As a result, even with the proper parameters [PC Preamble and SRB delay] informed by the mobile communication network NW, if the retransmission of the individual channel establishment completion message (rrc Connection Setup Complete) occurs due to a degraded wireless communication environment, the corresponding processing can smoothly be performed, thus enabling to suppress the retransmission.

Accordingly, the embodiments of this invention have specifically been described with the illustrations. However, the concrete forms are not limited to the embodiments, and changes in its design without departing from the scope of this invention are included therein.

For example, in each of the above-described embodiments, the wireless communication terminal 10 is a cell phone, but may also be a PDA (Personal Digital Assistants), a fixed wireless terminal or the like. In the second embodiment, the delay time Tn is not limited to T1×the number of times of the retransmission, and is preferable as long as Tn>T1. The second embodiment and the third embodiment may be combined together. As a result of this, the retransmission of the individual channel establishment completion message can further be suppressed.

INDUSTRIAL APPLICABILITY

This invention is applicable generally to wireless communication terminals, such as a cell phone, a PHS (Personal Handyphone System), a PDA and the like which are wirelessly connected to the mobile communication network NW and perform data transmission/reception with a participant's side, and is particularly effective when it is used in a point where deterioration occurs in the wireless communication environment with the wireless base station.

The invention claimed is:

1. A wireless communication terminal comprising a control unit which transmits an individual channel establishment request message to a mobile communication network, and which establishes an individual channel using an individual channel establishment parameter informed in response to said individual channel establishment request message from said mobile communication network, and which also transmits an individual channel establishment completion message to said mobile communication network based on transmission start timing included in said individual channel establishment parameter, said control unit to:
   store information representing that a retransmission of the individual channel establishment completion message has been done in a storage unit together with the retransmission of the individual channel establishment completion message, when a retransmission request message for the individual channel establishment completion message has been received from said mobile communication network;
   judge whether or not the transmission start timing is greater than a predetermined value in case where the retransmission of the individual channel establishment completion message has been done when transmitting a next individual channel establishment completion message; and
   switching between a transmission start timing adjustment process and a transmission power level adjustment process based on the judging result, the transmission start timing process adding a predetermined delay time to the transmission start timing included in the individual channel establishment parameter informed from said mobile communication network, the transmission power level adjustment process adding a predetermined additional power level to the transmission power level included in the individual channel establishment parameter informed from said mobile communication network.

2. The wireless communication terminal according to claim 1, further comprising
   a storage unit which stores the information representing that said individual channel establishment completion message has been retransmitted, wherein
   the control unit that determines whether the retransmission of the individual channel establishment completion message has been done or not based on the information stored in the storage unit.

3. The wireless communication terminal according to claim 2, wherein
   the control unit is configured to increase the predetermined delay time to be added to the transmission start timing, correspondingly to number of times said individual channel establishment completion message stored in said storage unit has been retransmitted.

4. A non-transitory computer readable medium encoded with a transmission function control program for controlling a computer to function as the control unit according to claim 1.

5. A transmission function adjusting method for use in a wireless communication terminal which transmits an individual channel establishment request message to a mobile communication network, and which establishes an individual channel using an individual channel establishment parameter informed in response to said individual channel establishment request message from said mobile communication network, and which also transmits an individual channel establishment completion message to said mobile communication network based on transmission start timing included in said individual channel establishment parameter, said method comprising:
   retransmitting said individual channel establishment completion message;
   storing information representing that this retransmission has been done in a storage unit, when a retransmission request message for said individual channel establishment completion message has been received from said mobile communication network;
   judging whether or not the transmission start timing is greater than a predetermined value in case where the retransmission of the individual channel establishment completion message has been done when transmitting a next individual channel establishment completion message; and
   switching between a transmission start timing adjustment process and a transmission power level adjustment process based on the judging result, the transmission start timing adjustment process adding a predetermined delay time to the transmission start timing included in the individual channel establishment parameter informed from said mobile communication network, the transmission power level adjustment process adding a predetermined additional power level to the transmission power level included in the individual channel establishment parameter informed from said mobile communication network.

6. The transmission function adjusting method according to claim 5, further comprising
   increasing the predetermined delay time to be added to the transmission start timing, correspondingly to number of times said stored individual channel establishment completion message has been retransmitted.

* * * * *